United States Patent [19]

Kaufman

[11] 4,159,355
[45] Jun. 26, 1979

[54] FOAM BONDING

[75] Inventor: Kenneth Kaufman, Mt. Laurel, N.J.

[73] Assignee: Scott Paper Company, Philadelphia, Pa.

[21] Appl. No.: 851,497

[22] Filed: Nov. 14, 1977

[51] Int. Cl.² .............. B29D 27/04; B05C 5/02; B05C 9/04
[52] U.S. Cl. .................. 427/209; 118/206; 118/257; 118/410; 222/547; 222/556; 264/46.3; 264/50; 264/257; 425/97; 425/102; 425/817 C; 427/385 R; 427/390 R; 427/445; 428/290; 428/310; 428/317
[58] Field of Search ............ 264/45.8, 45.3, 46.2, 264/46.3, 50; 19/145.3; 428/290, 310, 317; 425/97, 102, 817 C; 427/292, 385 R, 390 R, 445; 118/410, 407, DIG. 23, 257, 206, 415; 222/547, 556

[56] References Cited

U.S. PATENT DOCUMENTS

| 1,306,649 | 6/1919 | Weinheim | 427/209 |
|---|---|---|---|
| 1,928,568 | 9/1933 | Loomis | 427/209 |
| 3,166,454 | 1/1965 | Voelker | 264/46.3 X |
| 3,174,887 | 3/1965 | Voelker | 264/46.3 X |
| 3,181,199 | 5/1965 | Voelker | 264/45.8 X |
| 3,395,201 | 7/1968 | Kalwaites | 264/45.3 |
| 3,470,848 | 10/1969 | Dreher | 118/410 |
| 3,628,503 | 12/1971 | Neuhaus et al. | 118/410 |
| 3,638,604 | 2/1972 | Herzhoff et al. | 118/410 X |
| 3,645,773 | 2/1972 | Herzhoff et al. | 118/410 X |
| 3,687,712 | 8/1972 | Hartmann | 427/209 X |
| 3,862,472 | 1/1975 | Norton | 19/145.5 |
| 4,023,526 | 5/1977 | Ashmus et al. | 118/410 |

FOREIGN PATENT DOCUMENTS

| 1234286 | 10/1960 | France | 118/407 |
|---|---|---|---|
| 1047150 | 11/1966 | United Kingdom | 264/45.8 |

Primary Examiner—Philip Anderson
Attorney, Agent, or Firm—Martin L. Faigus; William J. Foley

[57] ABSTRACT

A method and apparatus for directing a foamed material, such as a foamed binder, across the lateral dimension of a moving surface in a uniform and controlled metered flow. In accordance with the method the foamed material is fed into an interior compartment of an applicator unit and is spread laterally as it moves through the compartment toward a laterally extending metering flow gap. After being laterally spread the foamed material is metered in a uniform, controlled manner across the lateral dimension of the moving surface. The applicator unit of this invention has a housing that includes a body portion and a door portion movable relative to each other to form, in a closed condition, the interior compartment that receives the foamed material. The body portion and door portion also aid in forming the laterally extending metering flow gap in communication with the interior compartment, and a passage extends through a wall of the housing to permit the foamed material to be introduced into the applicator unit.

18 Claims, 7 Drawing Figures

FOAM BONDING

BACKGROUND OF THE INVENTION

This invention relates to a method and apparatus for metering a foamed material in a uniform, controlled manner; most preferably for the purpose of applying the material uniformly across the width of a fibrous assemblage.

The dispensing of stable and non-stable foamed liquids onto a moving surface from an applicator unit is known in the art; as is exemplified by U.S. Pat. Nos. 3,181,199, issued to Voelker, and 3,395,201, issued Kalwaites. Although the properties of these two types of foamed liquids are very different from each other, they are both difficult to disperse as thin, uniform layers across the width of a moving surface. This is particularly troublesome with non-stable foams that tend to loose their cellular structure upon engaging the moving surface, since there is very little opportunity to doctor these foams into a uniform layer. The problem is most acute when the moving surface receiving the non-stable foam is a fibrous web, which is the case in the bonding operation described in the above-mentioned Kalwaites patent. In this latter situation the capillary properties of the fibrous web tend to aid in very rapidly breaking down the foam structure by drawing liquid from the foam into the web surface.

In accordance with the foam bonding technique disclosed in the above-mentioned Kalwaites patent, nozzles are employed to direct a foamed binder into nips provided between compression rolls and the fibrous web to be bonded. The nozzles will initially direct the foamed binder into engagement with the web in an uncontrolled manner, and thereafter, the binder will be forced into the web by the compression rolls. Even though the compression rolls will provide some metering of the binder, the Kalwaites technique is not believed to be well suited for use in obtaining a uniform cross-machine-direction distribution of binder on the web; especially if the web is wide. This lack of uniformity can create undesirable variations in product properties.

U.S. Pat. No. 3,181,199, issued to Voelker, is directed to an applicator for both generating a stable froth, such as of polyurethane, and thereafter directing the froth onto a moving surface in the form of a thick, stable foamed sheet. Voelker does not in any way relate to a method of metering a thin, uniform layer of a foamed material onto his moving surface. Clearly, Voelker does not even touch upon the special problems associated with achieving a uniform lateral distribution of non-stabilized foamed materials onto moving surfaces; especially onto fibrous webs where cell break down and liquid absorption tend to occur very rapidly.

In view of the state of the art, a need is believed to exist for an improved foamed liquid application method and apparatus for achieving a uniform cross-machine-direction application of a foamed material onto a moving surface without the need for doctoring the material, and, when the moving surface is a fibrous web, without the need for significantly compressing the web. It is to such a foamed liquid application method and apparatus that the present invention is directed.

SUMMARY OF THE INVENTION

In accordance with this invention both non-stabilized and stabilized foamed liquids can be metered through a metering flow gap of an applicator unit as a thin, sheet-like layer uniformly distributed across the lateral, or widthwise direction of a moving surface. This invention is particularly useful in applying a foamed liquid, such as a non-stabilized foamed binder, to a moving fibrous web; either by directly metering the foamed liquid onto a surface of the web or onto a surface of a conveyor belt or drum that is used to transfer the liquid to the web.

Since the foamed liquid, in accordance with this invention, is initially applied to a moving surface as a uniform layer, there is no need for a secondary "knifing" or "doctoring" operation. This is an extremely important advantage of this invention; especially when the foamed liquid is of the non-stable variety tending to break down rapidly upon contacting the moving surface. When such a non-stable foamed liquid is used there is virtually no opportunity to knife or doctor it into a uniform layer before the foam breaks down.

In this invention a foamed liquid is directed into an interior compartment of the applicator unit, and is thereafter spread in a lateral direction prior to being directed through the metering flow gap. This aids in establishing a controlled, uniform flow of the foamed liquid across the entire width of the flow gap; preferably in the form of a thin, sheet-like layer.

In the most preferred embodiment of the invention the interior compartment of the applicator unit includes surfaces that are spaced close to each other to form a premetering orifice. This orifice is located between an inlet opening for the foamed liquid and the metering flow gap to aid in laterally spreading the binder before it is directed through the metering flow gap.

In a preferred method of this invention a non-stabilized foamed liquid, such as a foamed binder, can be applied directly to a fibrous web from the applicator unit, and will penetrate into the web without a compressing operation. This is achieved as a result of the force imposed upon the foamed binder in the applicator to move it through the metering flow gap, the instability of the foamed binder, and the capillary forces present in the fibrous structure. All of these factors contribute to breaking down the cell structure of the foam so that the liquid binder will be drawn into the web.

The applicator unit of this invention is of an extremely simple construction for achieving excellent cross-machine-direction uniformity in the metering of a foamed liquid through the flow gap. The applicator unit includes a housing formed by a body portion and a door portion that are rotatable relative to each other to form, when in a closed condition, the interior compartment for receiving the foamed liquid. This interior compartment can be easily and thoroughly cleaned by merely opening the door portion of the housing, and flushing the exposed compartment. This movable mounting between the body portion and the door portion also permits easy maintenance and adjustment of interior parts.

The body portion and door portion of the housing also aid in forming the elongate, metering flow gap at an end of the interior compartment remote from a foamed liquid inlet passage. This metering flow gap communicates with the interior compartment to permit the controlled cross-machine-direction metering of the foamed liquid onto a moving surface; preferably as a thin, sheet-like layer.

In the preferred construction of the applicator unit an adjustable partition is included in the interior compartment to form the premetering orifice that helps to laterally spread the foamed liquid as it is directed toward the metering flow gap. Most preferably the premetering orifice and the metering flow gap are adjustable in a relatively simple and reliable manner to accommodate process changes such as, for example, a change in the type of foamed liquid being used.

It is an object of this invention to meter both stable and non-stable foamed liquids in a controlled manner uniformly across the width of a moving surface.

It is a further object of this invention to meter a thin, uniform, sheet-like layer of a foamed liquid from an applicator unit onto a moving surface.

It is a further object of this invention to meter a foamed liquid in a controlled manner across the width of a moving surface for the ultimate purpose of applying the liquid to a fibrous assemblage.

It is a further object of this invention to provide a unique method of applying a non-stabilized foamed liquid, such as a foamed binder, substantially uniformly across the width of a fibrous structure.

It is a further object of this invention to provide a foamed liquid applicator unit which is extremely versatile, and yet is simple in design and reliable in operation.

Other objects and advantages of this invention will become apparent by referring to the detailed description which follows, taken in conjunction with the drawings.

DESCRIPTION OF THE PREFERRED EMBODIMENTS OF THE INVENTION

Many different types of stable and non-stable foamed liquids can be applied to a moving surface in accordance with the method and apparatus of this invention. However, the description which follows will be directed primarily to the most preferred embodiment of the invention in which a non-stabilized foamed binder is applied to a fibrous web; either by directly metering the foamed binder onto the web, or alternatively, by metering the foamed binder onto the surface of a conveyor or drum that is used to transfer the binder to the web.

Figure 1:
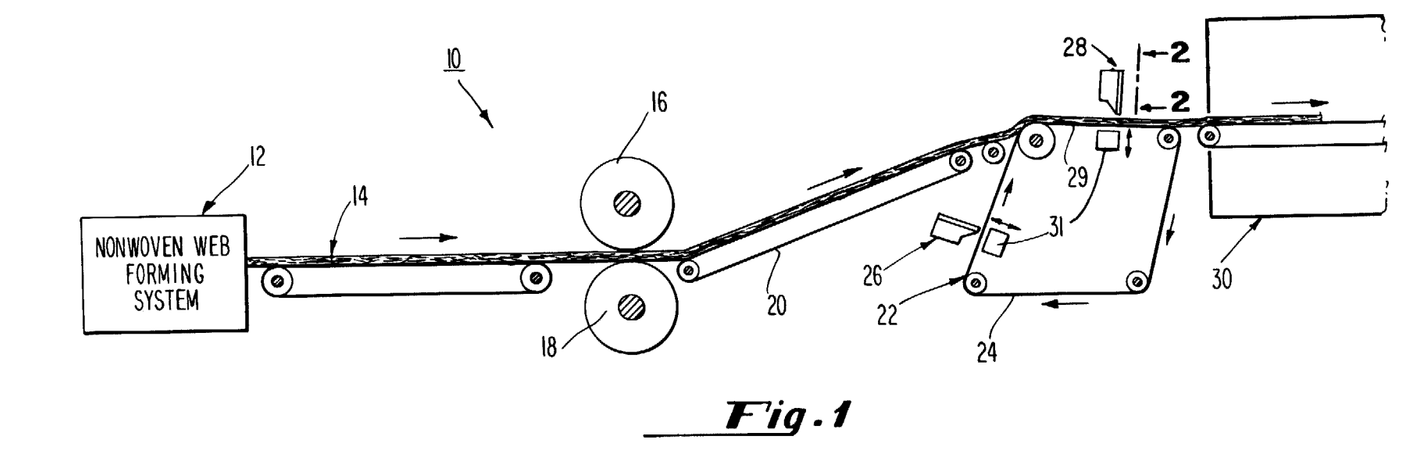
FIG. 1 is a schematic view of part of a web forming line employing a bonding system in accordance with this invention.

FIG. 1 shows part of a web forming line 10 employing a foamed bonding system in accordance with this invention. This line can include many different types of nonwoven web forming systems 12; however, in a preferred mode of practicing the invention an air-lay system is used; such as the one disclosed in U.S. Pat. No. 3,862,472, issued to Norton et al on Jan. 28, 1975, and assigned to Scott Paper Company. The Norton et al patent is incorporated by reference into this application.

In the Norton et al process a loosely compacted batt of short fibers, such as wood pulp, and an opened batt of longer, textile-length fibers, such as rayon or polyester, are directed into a blending device in which individual fibers from the batts are separated and blended together to form a relatively heavy basis weight feed mat. This feed mat is subsequently processed in a web-forming device into a lower basis weight fibrous web of the type that has been bonded in accordance with this invention. Specifically, the web forming device individualizes, or separates fibers from the feed mat and directs them in an air suspension through a conveying duct onto a foraminous web forming surface to form a fibrous web including a blend of the wood pulp and textile-length fibers; with the wood pulp fibers being the predominate fiber component, by weight, in the web. It is this latter web that is shown schematically at 14 in FIG. 1, and, as initially formed, is quite flimsy and difficult to handle in the web forming line. In order to improve the structural integrity of the web it can be either calendered or embossed, and this can be accomplished with a pair of compression rolls 16 and 18. Either one or both of these rolls can include a series of raised projections on its surface to form an embossed pattern in the web, if desired. However, even when the web is in a calendered and embossed condition it is still to weak for many applications, and will tend to lose its structural integrity unless further stabilized; such as by bonding. A typical embossed web that can be bonded in accordance with this invention is disclosed in co-pending application Ser. No. 497,024, filed Aug. 13, 1974, and entitled NONWOVEN FABRIC AND METHOD OF MAKING SAME. This latter application is incorporated by reference into the instant application.

After the web 14 has been compressed or embossed by the rolls 16 and 18, it is directed by a conveyor 20 to a foam bonding station 22. In the illustrated embodiment the bonding station 22 includes a web transport and binder transfer conveyor 24, and two foamed binder applicator units 26 and 28 of this invention. The conveyor 24 has a solid surface, and the applicator unit 26 deposits a thin layer of the foamed bonding material on this surface for subsequent transfer to the fibrous web 14. Therefore, the surface of the conveyor that receives the bonding material must be of a character that will transfer the foamed bonding material to the web 14 when a surface of the web engages the bonding material on the horizontal run 29. A silicone or PVC-coated conveyor is suitable for this purpose. As the web 14 moves along the horizontal run 29 the second applicator unit 28 directs a controlled, metered flow of foamed bonding material across the lateral extent of the opposed web surface; and the web 14, with bonding material applied to both surfaces, is directed into a conventional oven 30 to dry the web and set, or cure the binder. Thereafter the web can be rolled up for storage or use.

An adjustable back up plate 31 is positioned in alignment with each applicator unit 26 and 28, but on the side of the conveyor 24 opposite said units. These plates 31 are movable in the directions indicated by the double-headed arrows to permit adjustment of the spacing between the applicator units and the surfaces upon which the foamed binder is to be applied.

Although one web forming line 10 is shown in FIG. 1, it should be understood that this is shown only for purposes of illustration, and that foamed bonding systems in accordance with this invention can be employed in many different web forming lines. For example, the line can be designed so that both applicator units 26 and 28 apply the foamed bonding material to conveyor or roll surfaces positioned on opposite sides of the web. Thereafter these surfaces, with the foamed binder on them, can be moved directly into engagement with the opposed surfaces of the fibrous web to provide the bonding function. Alternatively, the foamed binder first can be applied directly to one surface of the web, and thereafter, the web can be turned to apply a foamed binder layer directly to the opposed web surface. If desired the bonding material applied to one surface of the web can be dried and/or cured by passing the web through an oven prior to applying the bonding material to the opposed web surface.

This invention can be employed to bond many different types of webs; including paper and wet-lay nonwoven webs. However, the invention is most beneficially employed to bond flimsy webs that, prior to bonding, are difficult to handle without fiber separation. In this latter situation the present invention can be employed to provide a uniform binder distribution without "picking" fibers from the web surface, and without significantly compressing the web to excessively reduce its thickness.

If desired this invention can be employed to apply the foamed binder to a fibrous web or drum surface as part of a creping operation. Specifically, the foamed binder can be employed to adhere the web to a creping drum for subsequent removal by a creping blade.

In accordance with this invention other types of foamed liquids can be introduced into a fibrous web. For example dyes can be added for aesthetics, and perfumes can be added for fragrance.

This invention resides in the construction of the foamed liquid applicator units 26 and 28, and in a unique method of employing these units to achieve controlled metering of small amounts of a foamed liquid onto a moving surface in a uniform manner. Since both of the units 26 and 28 are of the same construction, the invention can be specifically described in connection with a preferred use and structure of the applicator unit 28.

Figure 2:
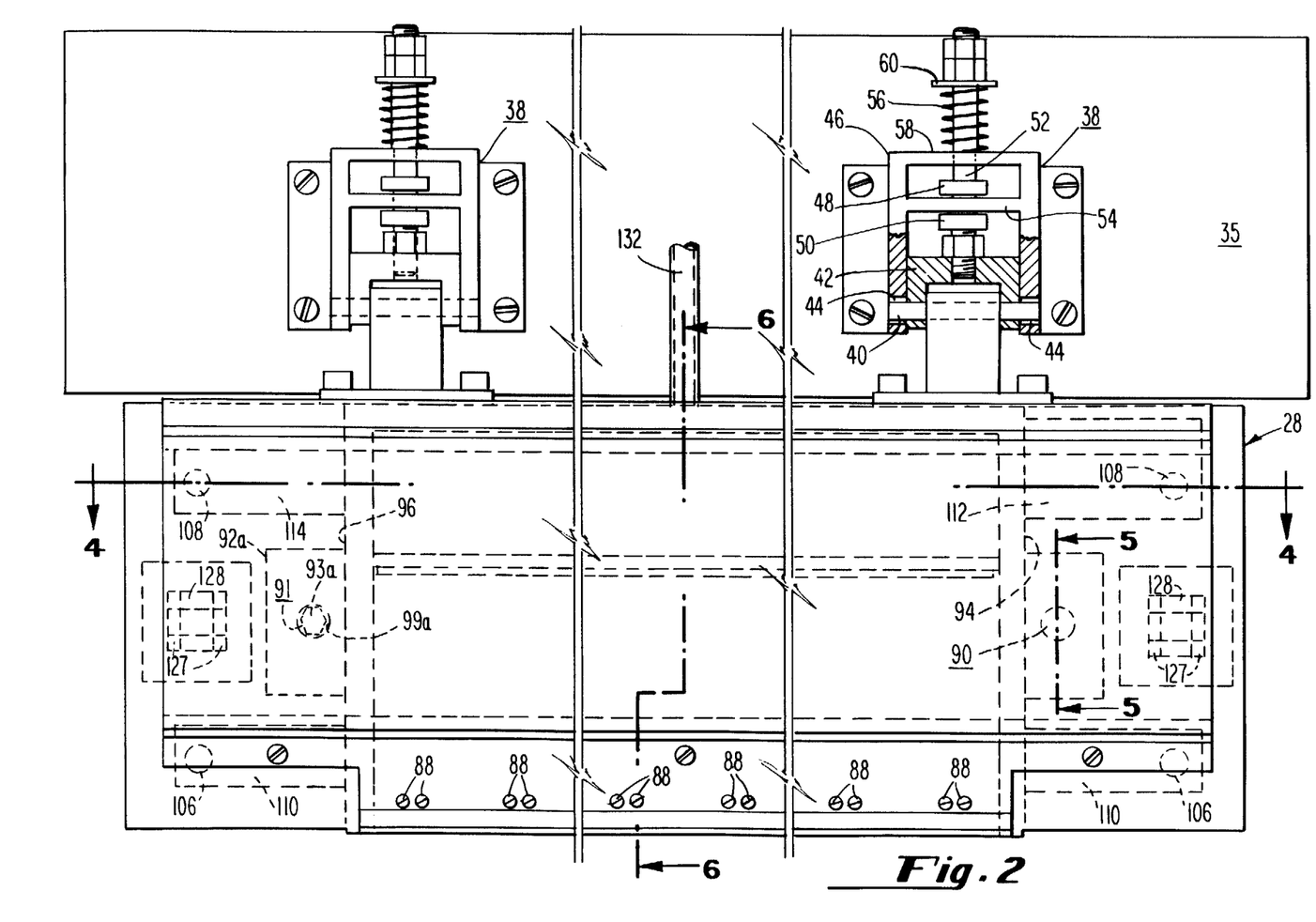
FIG. 2 is a front elevation view of a foamed liquid applicator unit in accordance with this invention, as viewed along line 2—2 of FIG. 1.
Figure 3:
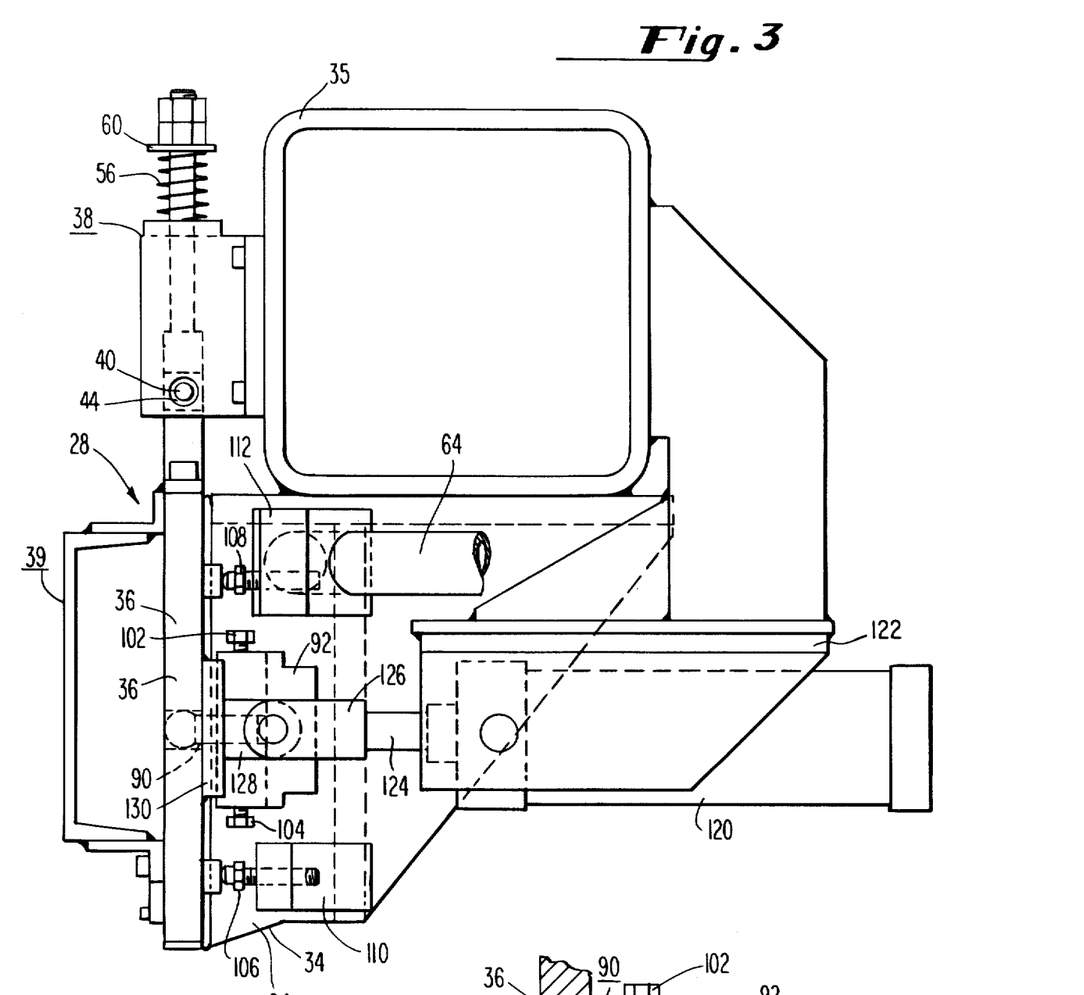
FIG. 3 is a side elevation view of the applicator unit, as viewed from the right of FIG. 2.
Figures 6, 7:
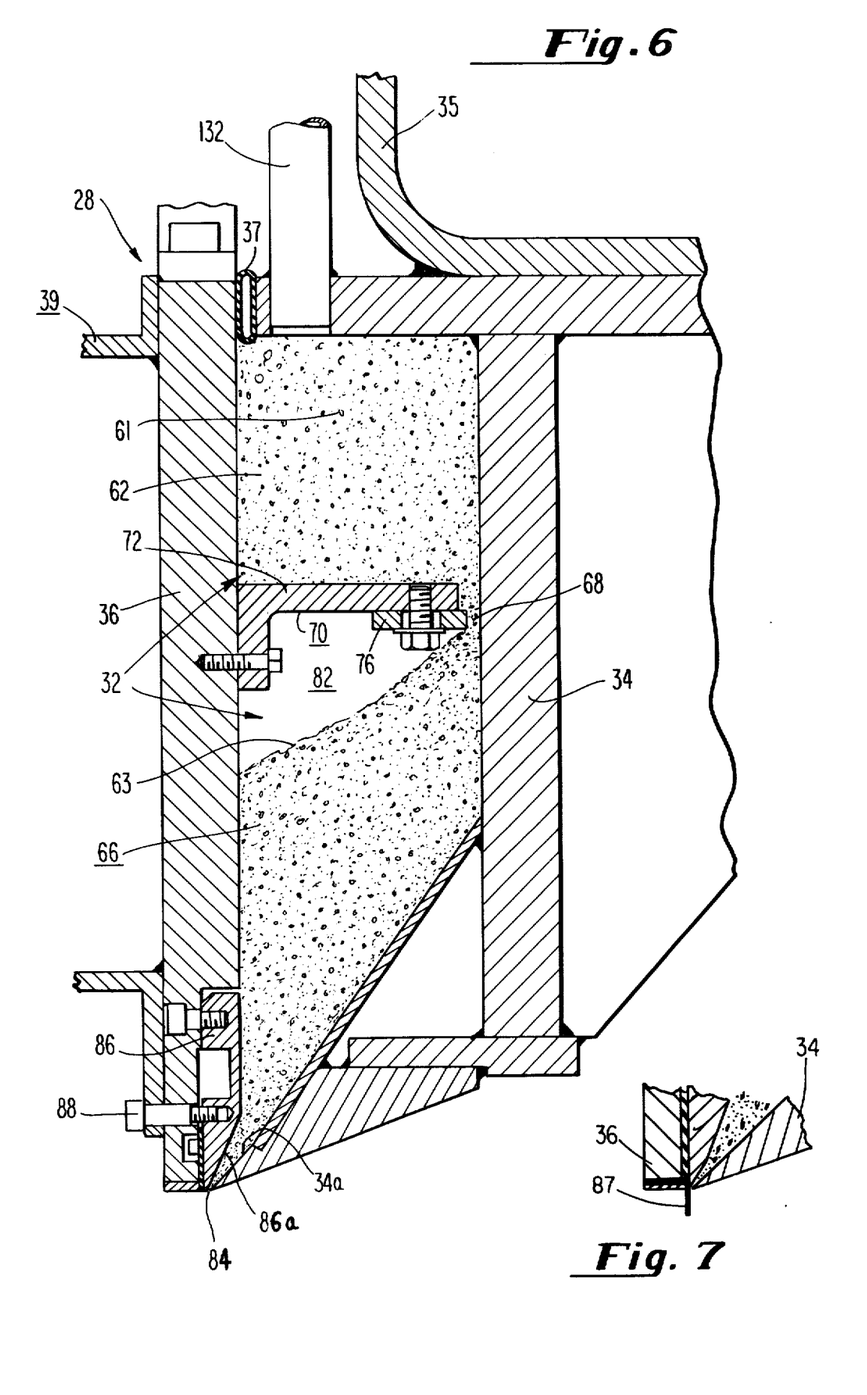
FIG. 6 is a sectional view along line 6—6 of FIG. 2.
FIG. 7 is a fragmentary sectional view of an alternate embodiment of a metering flow section of a foamed liquid applicator unit.

Referring to FIGS. 2, 3 and 6, the applicator unit 28 includes an interior compartment 32 formed by a main body portion 34 and a movable door portion, or closure 36. The main body portion is fixed to suitable framework, such as is indicated at 35, and the door portion is rotatable relative to the body portion. In addition the entire unit is rotatable about an axis (not shown) so that it can be moved out of the way for initially threading the web 14 through the line during start up, or if necessary, for the purpose of cleaning the line.

The door 36 is movably mounted relative to the main body 34 through a pair of spaced-apart floating hinges 38. These floating hinges permit slight adjustments to be made in the position of the door relative to the main body to change the operating conditions of the unit 28, as will be explained in detail hereinafter. In order to maintain the interior compartment 32 liquid-tight the mating surfaces of the door 36 and main body 34 are provided with suitable sealing gaskets, such as those indicated at 37 in FIGS. 4 and 6. To prevent warping of the door a stiffening assembly 39 is provided (FIGS. 3, 4 and 6).

Referring to FIGS. 2 and 3, each of the floating hinges 38 includes an axle 40 rotatably secured within a vertically movable block 42 so that the door can be rotated relative to the body portion. The opposed ends of the axle extend beyond the block 42 into enlarged end passages 44 in the legs of a generally U-shaped frame 46 that in turn is attached to the fixed framework 35. These enlarged passages 44 permit a slight, or limited floating action of the block 42 and axle 40 within the confines of the frame 46. Movement of the block 42 is limited by spaced nuts 48 and 50 secured to a threaded bolt 52 on opposite sides of an intermediate horizontal section 54 of the frame 46. In order to counterbalance the weight of the movable door 36 a compression spring 56 is interposed between the horizontal base 58 of the U-shaped frame 46 and a washer 60 retained adjacent the upper end of the threaded bolt 52.

Figure 4:
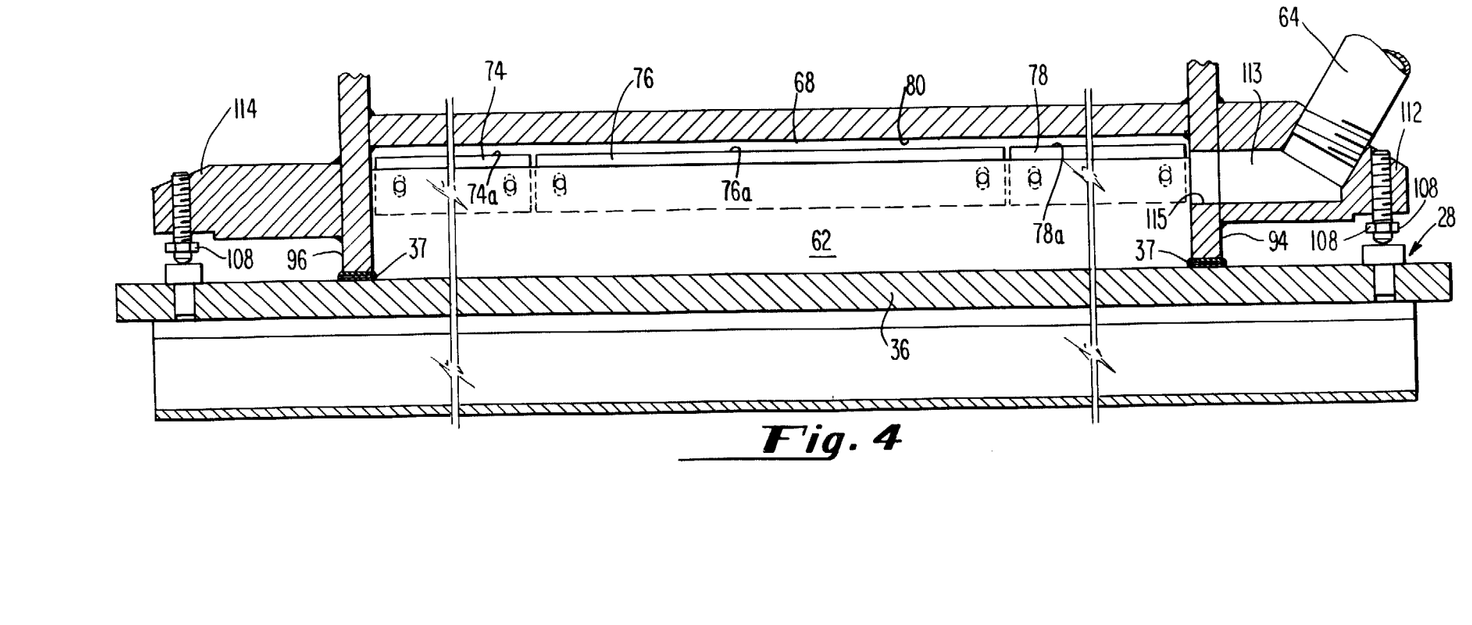
FIG. 4 is a sectional view along line 4—4 of FIG. 2.

Referring to FIGS. 4 and 6, the interior compartment 32 of the applicator unit 28 includes an upper receiving section, or plenum 62 for initially receiving the foamed binder 61 from a conventional foaming device (not shown). In this invention applicant has satisfactorily employed an Oakes foam generating device (Model 14 MT5A), manufactured by Oakes Machine Corporation in Islip, New York, for whipping air into a liquid binder to form the foamed binder system. The foamed binder 61 is introduced into the upper receiving plenum 62 through an inlet conduit 64, as can be seen best in FIG. 4, and then passes into a lower delivery section, or plenum 66 through a premetering orifice 68, as can be seen best in FIG. 6.

The premetering orifice 68 is provided by a partition 70 that includes an L-shaped bracket 72 connected to the inner wall of the movable door 36, and a series of plates 74, 76 and 78 adjustably connected to this bracket. The inner surfaces 74a, 76a and 78a of the adjustable plates cooperate with the rear wall 80 of the compartment 32 to form the premetering orifice 68, and to permit different adjustments to be made to the orifice gap across the width of the bonding unit (FIG. 4).

Although the partition 70 is shown as including three adjustable plates, the number of plates can be varied, depending primarily upon the width of the bonding unit. For example, the bonding unit illustrated in this application is 40 inches wide. However, in wider units it may be desirable to include more plates to permit greater latitude in controlling the gap of the premetering orifice 68 in different regions across the width of the unit. In bonding units of a width less than 40 inches it may only be necessary to form the partition 70 with a single adjustable plate.

Although the illustrated embodiment shows the bracket 72 of the partition 70 connected to the inner surface of the movable door 36, it is possible, and in some cases desirable to reverse this arrangement. Specifically, the bracket 72 can be connected to the inner surface of the main body 34, and the premetering orifice 68 established between the inner surfaces 74a, 76a, 78a of the adjustable plates 74, 76 and 78, respectively, and the inner surface of the movable door 36. The particular arrangement that is employed depends upon the orientation of the bonding unit 28. For example, if the unit is tilted so that the door 36 is lower than the main body 34 the premetering orifice 68 should be established between the inner surface of the door and the partition 70 to permit the foamed binder to flow from the upper plenum 62 to the lower plenum in a metered fashion. For the same reason the premetering orifice should be established between the inner surface of the main body 34 and the partition 70 when the bonding unit is tilted in the opposite direction.

Referring to FIG. 6, an extremely significant and preferred feature of this invention resides in the formation of a pocket of compressed air 82 that is established as the foamed binder 61 moves through the premetering orifice 68 into the lower delivery section, or plenum 66. What happens is the foamed binder 61, being a viscoelastic material, traps a pocket of air between its upper surface 63 and the partition 70. This air pocket exerts a substantially uniform force on the foamed binder across the width, or cross-machine-direction of the applicator unit 28, and this aids in helping to establish a controlled, uniform, metered flow of the foamed binder out of a metering flow gap 84 extending across the width of the applicator unit at an end of the lower delivery section 66 remote from the partition 70. This metering flow gap 84 is formed, in part, by the lower most edge of a flexible profiling plate 86, and by a lower bottom edge of the main body 34. The apparatus is provided with a number of laterally spaced apart adjustment screws 88 (FIGS. 2 and 6) that are alternately threaded into and against the profiling plate 86. These screws can be individually actuated to flex the plate for adjusting the opening of the metering flow gap 84 along the lateral extent of the applicator unit.

The applicator units 26 and 28 are most beneficially used when it is desirable or necessary to meter small quantities of a non-stabilized foamed binder in a controlled manner across the width of a moving surface for the ultimate purpose of applying a uniform coating of the binder across the width of a fibrous web structure. For example, a bonding station 22 of the type shown in FIG. 1 can be beneficially used to bond an embossed air-laid web in the basis weight range of from about 0.5 oz./yd.$^2$ to about 6 oz./yd.$^2$ with an adhesive add-on, based upon the final weight of the product, of less than 20%, and most preferably on the order of 10%.

Different types of binders can be employed in accordance with this invention; provided that they are foamable. For example, different types of latex binders; including acrylics (e.g., HA-8 sold by Rhom & Haas, Philadelphia, PA), ethylene vinyl acetates (e.g., TR-120 sold by Air Products and Chemicals, Allentown, PA) and styrene butadiene rubbers (e.g., AM-5100 sold by Union 76-AMSCO, Charlotte, NC); have been employed successfully in this invention. These binders have been foamed with different amounts of surfactants, and with no plasticizers or other foam-stabilizing agents, thus providing the non-stability desired in the preferred foams utilized in this invention. Applicant has employed foamed binders having densities up to about 0.20 gm./ml., and densities of less than 0.10 gm./ml. have worked best. Most preferably the density of the foamed binder is kept at a level no higher than 0.07 gm./ml. Representative foamed binders useable in this invention are also disclosed in earlier-discussed U.S. Pat. No. 3,395,201, issued to Kalwaites. This latter patent is incorporated herein by reference.

Non-stabilized foamed binders are preferred for use in this invention because their cellular structure will readily break down upon being applied to the surface of a fibrous web to permit the liquid to penetrate and bond the web without forming a binder skin that can adversely effect handfeel and absorbency. The preferred non-stabilized foamed binders that have been used in this invention, when left to stand in a filled, 1000 ml. beaker at standard temperature and pressure, will have at least 50% of their liquid content drain to the bottom of the beaker within ten minutes. These types of foams are clearly distinguishable from stabilized foams of the type that are deposited on a moving surface to form a physically distinct sheet or layer, either by itself, or as part of a laminate construction. The cells of the stabilized foams do not break down rapidly upon being directed onto a moving surface, even when the moving surface is a fibrous web. The sheet or layer formed from these foams will actually have a permanent cellular structure after setting or curing.

In the preferred operation of the applicator units 26 and 28 the premetering orifice 68, across its entire lateral dimension, has a spacing greater than that of the metering flow gap 84. For example, in using a 40 inch wide applicator unit of this invention with a non-stabilized foamed binder, the inner surface 74a of the adjustable plate 74 has been spaced from about 40-60 mils from the interior wall 80 of the main body 34; the inner surface 76a of the adjustable plate 76 has been spaced about 100 mils from this interior wall, and the inner surface 78a of the adjustable plate 78 has been spaced about 25 mils from this interior wall. In this embodiment the opening of the metering flow gap 84 has been maintained at from about 18 to about 20 mils. The premetering orifice 68 will aid in laterally extending the foamed binder across the width of the applicator unit; but not with the degree of uniformity that is generally required for direct use in bonding a fibrous web. However, the binder, after premetering, is in a condition to be subsequently metered in a controlled uniform manner through the narrow constriction provided by the metering flow gap 84. To aid in refining the lateral distribution of the foamed binder the lower plenum 66, for at least a portion of its length, tapers toward the metering flow gap 68 to thereby decrease the depth of the plenum (FIG. 6). This also tends to spread the foamed binder in a lateral direction to aid in achieving a controlled metering of the binder through the metering flow gap 84. As indicated earlier, the force established by the air compressed in the pocket 82 is substantially uniform across the width of the upper surface 63 of the foamed binder 61, and this provides a very desirable function in helping to establish controlled, uniform metered flow of small quantities of the foamed binder through the entire lateral extent of the gap 84; preferably as a thin, sheet-like layer.

The volumes of the upper and lower plenums 62 and 66, in applicators having a width greater than one foot, should each preferably be at least 71 in.$^3$/ft. of lateral length to achieve a high degree of uniformity. Excellent results have been obtained with the volume in the upper plenum 62 at about 115 in.$^3$/ft. of lateral length, and with the volume in the lower plenum at about 180 in.$^3$/ft. of lateral length. Excellent results have been obtained by directing a foamed binder having a density of 0.06 gm./ml. through the bonding units at a rate in excess of 350 (gm/min.)/(12 inches of lateral length) (100 feet per minute of line speed); lower flow rates giving equivalent results with lower densities (e.g., 175 (gm./min.)/(12 inches of lateral length) (100 feet per minute of line speed) at a foam density of 0.03 gm./mil.). In some cases satisfactory results can be obtained at flow rates as low as 175 (gm./min.)/ (12 inches of lateral length) (100 feet per minute of line speed) with foams having a density greater than 0.03 gm./mil. The line speed is determined at the downstream end of the line, where the web is generally rolled for storage of subsequent use.

The most desirable manner of operating the bonding units 26 and 28 is to position the lower edge of the profiling plate 86, which forms the downstream edge of the flow gap 84, either on the same level or just beneath the edge (e.g., less than 5 mils) of the main body 34 that forms the upstream edge of the gap. If the downstream edge of the gap is positioned above the upstream edge the foamed binder tends to curl around the downstream edge to prevent controlled uniform metering of the foamed binder out of the applicator unit. With the desired arrangement noted above, heights of the downstream lip above the moving surface range up to about 0.050 inches.

Referring to FIG. 7, a soft flexible rubber sheet 87 has been used in conjunction with the downstream lip. Good results have been obtained with 1/64" thick neoprene sheet rubber extending typically ⅛" past the metering gap opening. This flexible lip tends to follow the contour of a fibrous web, which may be irregular. Variations in web thickness of ±⅛" may easily be accommodated while maintaining the uniform sheet-like quality of the foamed binder leaving the metering flow gap 84. The lip rides on the foamed sheet, but neither doctors the foam nor excessively compresses the web. What the lip does is convey the sheet-like binder layer to the web surface, while preventing said layer from breaking up into irregular lumps or globules.

Although the premetering orifice 68 and the metering flow gap 84 can be adjusted, they are generally maintained in a fixed position during each production run. Adjustment may be necessary if the type of foamed binder is changed; but ordinarily there is very little need to change the settings once they have been made.

From the above discussion it should be apparent that the foamed binder is not generated in the applicator unit 28. The applicator unit of this invention is designed to receive the liquid after it has been foamed and thereafter meter it in a controlled manner through the metering flow gap 84. This is significantly different from the system disclosed in the earlier-referenced Voelker patent; involving entirely different design considerations.

Figure 5:
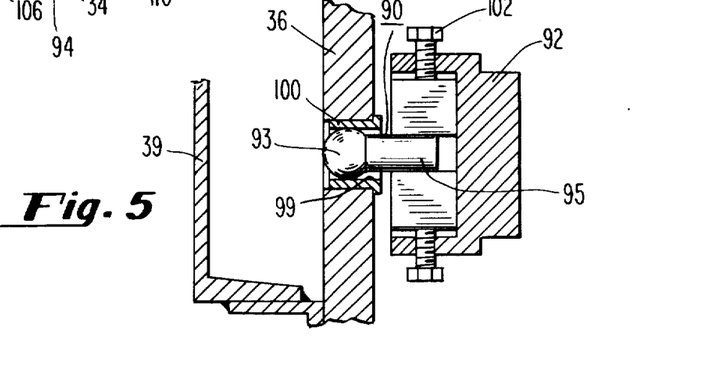
FIG. 5 is a sectional view along line 5—5 of FIG. 2.

Referring to FIGS. 2, 5 and 6 the applicator unit 28 has several unique features which enhances its versatility. As indicated earlier, the movable door 36 is rotatably mounted through floating hinges 38 to move relative to the main body 34. In the preferred embodiment of the invention inner surfaces of the profiling plate 86 and a lower region of the main body 34, indicated at 86a and 34a respectively, slope toward each other and terminate in the flow gap 84. This arrangement of sloping surfaces permits adjustment of the depth of the metering flow gap by merely changing the vertical position of the door 36 relative to the main body 34. Small changes in the vertical position of the door relative to the main body are permitted by the floating hinges 38.

In order to maintain the door 36 in different vertical positions, vertically adjustable locating members 90 and 91 are employed (FIGS. 2, 3 and 5). These members are mounted in supporting brackets 92 adjacent side walls 94 and 96, respectively. As can be seen in FIG. 5 the locating member 90 includes a generally spherical head 93 joined to one end of a stem section 95. The head 93 is received within a cylindrical opening 99 of a bushing 100 retained within the door 36, and the location of the member 90 relative to the door can be adjusted through opposed jack screws 102 and 104. The locating member 91 is adjustably mounted within a supporting bracket 92a, identical to bracket 92, in the same manner as the locating member 90. However, as can be seen in FIG. 2, the locating member 91 includes a head 93a that is not spherical, and actually has a maximum lateral dimension less than the diameter of the cylindrical opening 99a of its cooperating bushing. This reduced lateral dimension is desirable to avoid the necessity of imposing excessively stringent tolerances on the lateral spacing of the locating members 90 and 91, relative to the lateral spacing of the bushings in which the heads of the locating members are received. From the above discussion it should be apparent that slight vertical adjustments of the door 36, within the limits of movement permitted by the floating hinges 38, can be established and maintained by adjusting the position of the locating members 90 and 91 through the jack screws 102 and 104. As explained above this will actually effect an adjustment of the metering flow gap 84.

Referring to FIGS. 2, 3 and 4, an additional means of adjusting the metering flow gap 84 is provided by a pair of adjustable door stops 106 and 108 positioned adjacent each side wall 94 and 96 of the main body 34. Each of the door stops 106 is adjustably positioned within an identical bracket 110, and the door stops 108 are adjustably positioned with brackets 112 and 114, respectively. As can be seen best in FIG. 4, the bracket 112 has a hollow passage 113 which communicates with the foamed binder inlet conduit 64 at one end, and with a opening 115 extending through the side wall 94 of the main body at the other end. The opening 115 directs the foamed binder into the upper receiving plenum 62 of the interior compartment 32.

The door stops 106 and 108 actually aid in adjusting both the premetering orifice 68 and the metering flow gap 84 by varying the spacing between the main body 34 and movable door 36. Note that the sealing gaskets 35 are hollow compressible members, and are designed to permit the sealing function to be maintained even when the door 36 is moved slightly in a direction away from the main body 34 to enlarge the premetering orifice and flow gap.

Referring to FIGS. 2 and 3, fluid-actuatable cylinders 120 (only one of which is completely shown in FIG. 3) are operated through suitable fluid lines (not shown) and are supported by brackets 122 adjacent the opposed side walls 94 and 96 of the main body 34. Only one of these mountings is shown in FIG. 3; the other mounting being identical. Each of the pneumatic cylinders 120 includes a piston rod 124 having a mounting clevis 126 (FIGS. 2 and 3) at one end thereof. The clevis includes spaced apart fingers 127 rotatably connected to a flange 128 of a supporting bracket 130 that is attached to an interior surface of the door 36 (FIG. 3). Thus, actuation of the fluid cylinders 120 will rotate the door 36 about its floating hinges 38 to either open or close said door, as desired.

As can be seen best in FIGS. 2 and 6 a flushing line 132 can be attached through an opening in the top wall of the main body 34 to provide communication for helping to flush out the interior compartment 32 without opening the door 36. However, when a thorough cleaning or flushing is required, the door 36 is opened to expose the entire interior compartment. The movable arrangement permitting the door to be opened for cleaning the interior compartment is very important; especially when residues of the foamed liquids are of the type that will harden and clog the applicator units if they are allowed to remain in the units between uses.

As a result of the unique construction of the foamed liquid applicator units 26 and 28, a convenient and reliable arrangement is provided for easily adjusting the metering flow gap 84, and also for providing easy access to the interior compartment 32 to permit thorough cleaning of the compartment, and, when desired, to permit adjustment of the plates 74, 76 and 78 of the partition 70 for adjusting the premetering orifice 68.

Having described my invention I claim:

1. A method of metering a foamed material across the lateral dimension of a surface of a moving substrate in a controlled manner, said method including the steps of:
forming a foam material comprising a liquid and a gas; thereafter
directing the foamed material under pressure into a receiving section of the interior compartment of an applicator unit above a partition means extending into said compartment, said interior compartment terminating at one end in a narrow, elongate metering flow gap having a depth up to about 60 mils;
forming a single pocket of compressed air that extends laterally across the interior compartment by trapping air in the compartment between the partition means, walls of said compartment and an upper surface of the pressurized foamed material, said pocket of compressed air establishing a substantially uniform force along the upper surface of the foamed material across the lateral dimension of the compartment to thereby impart a substantially uniform force to the foamed material for metering it in a controlled manner uniformly through the narrow flow gap; and
moving the substrate past the metering flow gap with the elongate dimension of said flow gap extending laterally across the width of the substrate surface, whereby a controlled quantity of the foamed material metered through the flow gap is deposited uniformly across the width of the substrate surface.

2. The method of claim 1 including the step of moving the foamed material from the receiving section to a delivery section of the compartment through a foam premetering orifice established by the partition means and extending laterally across the compartment adjacent one side thereof for aiding in distributing the foamed material laterally across the width of the interior compartment and in establishing said single pocket of compressed air.

3. The method of claim 2 including directing the foamed liquid through the applicator unit at a flow rate of at least 175 (gm/minute)/(12" lateral length) (100 feet per minute of web forming line speed).

4. The method of claim 2 wherein the receiving section and delivery section each have volumes greater than 71 in$^3$/foot of lateral length.

5. The method of claim 3 including the step of establishing the foam premetering orifice between an edge surface of the partition means and an interior wall of the compartment, said edge surface and interior wall being spaced apart a distance greater than the surfaces forming the metering flow gap.

6. The method of claim 5 including the step of spacing the surfaces forming the premetering orifice so that they are no more than about 100 mils apart.

7. The method of claim 1 wherein the foamed material is a non-stabilized foamed material.

8. The method of claim 1 wherein the foam material that is formed is a non-stabilized foamed binder, including applying the binder to the surface of the moving substrate for the purpose of bonding a fibrous assemblage that, prior to bonding, is flimsy and difficult to handle without fiber separation.

9. The method of claim 8 wherein the surface to which the foamed binder is applied is a surface of the fibrous assemblage.

10. The method of claim 8 wherein the surface to which the foamed binder is applied is a binder transfer surface that is moved into engagement with a surface of the fibrous assemblage to transfer the binder to said assemblage.

11. An apparatus adapted to meter a foamed liquid in a controlled manner across the lateral dimension of a surface of a moving substrate, said apparatus including a housing comprising a body portion and a door portion rotatable relative to each other between opened and closed conditions, said body and door portions forming an interior compartment for receiving the foamed liquid when in a closed condition, partition means joined to an interior surface of one of said body portion and door portion for dividing the interior compartment into an upper receiving section for the foamed liquid on one side of said partition and a lower delivery section on the opposite side of said partition, a passage communicating with the liquid receiving section of said interior compartment through a wall of said housing to permit foamed liquid to be introduced into said compartment, said body portion and said door portion, when in a closed condition, aiding in the formation of a laterally extending metering flow gap spaced from the partition means and communicating with the lower delivery section of the interior compartment through which the foamed liquid can be directed from the lower delivery section of said interior compartment onto the surface of the moving substrate.

12. The apparatus of claim 11 including means for adjusting the position of the door portion relative to the body portion while maintaining the door portion and body portion in a closed condition.

13. The apparatus of claim 11 including an elongate, flexible member extending laterally across the door portion and being attached to said door portion, and adjustment means for engaging said flexible member and adapted to move said flexible member relative to the body portion to permit the spacing of the metering flow gap to be varied.

14. The apparatus of claim 11 including a flexible lip extending from the metering flow gap for guiding the foamed liquid in a thin, sheet-like layer onto the surface of the moving substrate.

15. The apparatus of claim 11 wherein the door portion is movable relative to the body portion on floating hinge means.

16. The apparatus of claim 11 wherein said partition means includes adjustable members for providing an adjustable premetering orifice to aid in laterally distributing the foamed liquid as it moves from the receiving section to the delivery section of the interior compartment.

17. The apparatus of claim 11 wherein said partition means is connected to the door portion of the housing.

18. The apparatus of claim 11 wherein the receiving section and the delivery section each have volumes greater than 71 in$^3$/foot of lateral length.

* * * * *